Patented Mar. 27, 1951

2,546,446

UNITED STATES PATENT OFFICE 2,546,446

PRODUCTION OF RUBBER PRODUCTS

Lynn Harbison, Akron, Ohio, assignor to Phillips Petroleum Company, a corporation of Delaware No Drawing. Application October 18, 1948, Serial No. 55,241

17 Claims. (Cl. 260—780)

This invention relates to the production of rubber products. In one of its more specific aspects it relates to the retardation of vulcanization of rubber mixes. In still another one of its more specific aspects it relates to retarding too rapid acceleration of vulcanization caused by high pH carbon black. In still another of its more specific aspects it relates to new vulcanized rubber products.

In the manufacture of molded rubber products, crude rubber is milled with desired fillers, softeners, sulfur and accelerators. In the first stage of plant processing, carbon black and other ingredients, except the accelerator of vulcanization and sulfur, are added with the mixing temperature reaching a maximum in the range of 290° to 330° F., especially for tread compounds. A mixed stock, whether mill mixed or Banbury mixed, is cooled with a water spray in order to aid in reducing the temperature of the mixed stock to room temperature as soon as possible. After this first stage mixing, the rubber mix is placed on what is termed a "sheet-out" mill and the mixed stock is cut in slabs and subjected to a water spray. These slabs are then cooled in the air, usually for about one-half to three-quarters of an hour, and then placed on a skid to age, generally for a minimum of 5 hours. The second step is to take this master batch form and add the accelerator and sulfur in a Banbury mixer or on a mill. During this step the temperature should not be greater than about 230° F., decidedly cooler than the original mix when the carbon black is added. This final mix is cooled with a water spray, air-cooled and then aged at room temperature. This mixed stock is cooled as rapidly as possible in order to avoid "scorched" material. The next step in processing is calendering or tubing which is usually carried on in the range of 150° to 300° F. The calendered or tubed product is then vulcanized. The most common vulcanizing temperature for tires is 260° to 300° F. For very large tires the curing temperature may be dropped to as low as 260° F. In the case of molded industrial products, a temperature of about 320° F. is the upper range at which vulcanization is carried out. In carrying out the plant processes of second-stage mixing and of calendering or tubing, it is necessary that the mixed rubber is not partially vulcanized prematurely. If vulcanization occurs prematurely in factory processing, factory operations cannot be carried out efficiently. This premature vulcanization is known as scorching.

In recent years many new carbon blacks have become available to the rubber industry. Chief among these new carbon blacks are combustion furnace blacks, which in general have a higher pH than the older type of channel black or thermal furnace blacks. Combustion furnace carbon blacks have a pH of from 8 to 10.5, usually from 8.6 to 10.1. For instance, one commercially available high abrasion combustion furnace (HAF) black, has a pH of approximately 9.1 and a commercially available high modulus combustion furnace (HMF) black, has a pH of approximately 9.7. In contrast to the pH of these combustion furnace blacks, channel blacks usually have a pH value on the acid side in the neighborhood of 3.8 to 6. Furnace blacks such as those just mentioned have many characteristics which add useful properties to the finished rubber product. Thus, the HAF black has a high degree of "structure" and rubber products containing this black have very good resistance to abrasion. There are several high pH furnace blacks now on the market which add valuable properties to the finished rubber product. These high pH carbon blacks have caused considerable difficulty to the rubber compounder and processor as pointed out by C. W. Sweitzer and W. C. Goodrich in the Rubber Age, volume 55, No. 5, August, 1944, at page 471. The pH of the carbon blacks has a decided effect on the rate of vulcanization. High pH carbon blacks accelerate cure or vulcanization. Sweitzer and Goodrich point out that due to this factor economy in organic acceleration is permitted. However, in most cases changing the recipe of a rubber mix, that is, changing the amount of organic accelerator and sulfur, also changes the properties of the finished rubber product. It has an effect on such properties as tensile strength, heat build-up, the compression set, the hardness, the resistance to abrasion, the modulus of elasticity, the elongation, etc. Accelerator starvation with HAF black results in low abrasion resistance. The rubber compounder using these high pH carbon blacks has been confronted with the problem of maintaining the desired properties in the finished product by maintaining the proper amount of organic accelerator and sulfur while trying to overcome the problem of scorch or premature vulcanization. Well-known retarders of vulcanization such as N-nitroso diphenyl amine, rosin and salicylic acid in a dispersing agent have been unsuccessful in overcoming the problem.

I have discovered new retarders of vulcanization which can be used with organic accelerators so as to give the desired properties to the finished product while overcoming this problem of scorch. I have discovered that chlorinated paraffin hydrocarbons will retard vulcanization so as to overcome the problem of scorching during plant processing due to high pH carbon black used in the rubber mix.

One object of this invention is to provide a method for retarding vulcanization of rubber mixes.

Another object of this invention is to provide a method by which premature vulcanization caused by the use of high pH carbon blacks in conjunction with organic accelerators of vulcanization can be overcome.

Still another object of my invention is to produce new vulcanized rubber products.

Still another object of this invention is to increase the Mooney scorch time of rubber mixes.

Still another object of this invention is to provide a method to increase the Mooney scorch time of a rubber mix which has a low scorch time due to a high pH carbon black being present in the mix.

Many other objects of this invention will become apparent to one skilled in the art from this disclosure.

Premature vulcanization, referred to as "scorch" during the processing of rubber products, must be prevented in order to allow the rubber mix to be preformed and shaped before it is cured or vulcanized. Testing methods, run on test samples, have been devised and standards have been set so as to determine if a particular rubber mix will scorch during processing. The most frequently used testing method is that run on a Mooney shearing disc viscometer. These Mooney viscometers come equipped with a large rotor (1½ inches in diameter) and a small rotor (1$\frac{7}{6}$ inches in diameter). The viscometer can be set to operate at any given temperature. The Mooney scorch test is made by using the small rotor with the machine usually set to operate at 250° F., that is, the temperature of the rubber sample on which the scorch test is being run is held at 250° F. Primarily the instrument consists of a disc rotor which turns in a shallow cylindrical chamber recessed into two horizontal platens. The surfaces of the chamber and rotor are knurled to prevent slippage. The sample is formed in place around the rotor as the chamber is closed. The rubber is sheared by the rotor which is driven by a synchronous motor. The resistance of the rubber to this shearing action develops a thrust in a floating horizontal worm shaft which presses against a deflecting U-shaped steel spring. The deflection is read on a dial gauge and in proportional to the true mean viscosity of the sample. In determining the scorch time, deflection readings are taken at one minute intervals until the deflection of the indicator increases appreciably. At this point the viscosity of the rubber mix sample has increased due to the beginning of vulcanization. The Mooney scorch time is then given as the time in minutes at which vulcanization began indicated by the appreciable increase in viscosity readings. In this disclosure Mooney scorch time when used means the time in minutes at which the viscosity of the sample began to increase appreciably because of vulcanization. Mooney shearing disc viscometers are widely used in the rubber industry, and one skilled in the art will have no difficulty in determining and understanding what I mean by the Mooney scorch time.

I have discovered that a chlorinated paraffin hydrocarbon containing 40 to 72 weight per cent combined chlorine and having from 20 to 28 carbon atoms, or mixtures of such chlorinated paraffin hydrocarbons, will effectively retard vulcanization of rubber mixes. The chlorinated paraffins which I use in my invention are made by chlorinating a mixture of paraffin hydrocarbons. The chlorinated paraffins which I use contain molecules having at least 20 but no more than 28 carbon atoms per molecule and from 40 to 72 weight per cent combined chlorine. In carrying out my process I have found that chlorinated paraffin hydrocarbons, CP-70 or CP-40, which can be obtained from the Akron Chemical Company, Akron, Ohio, are suitable. CP-70 is a white powder, having an average combined chlorine content of 71 weight per cent, containing from 68 to 72 weight per cent combined chlorine, and containing molecules having at least 20 but no more than 28 carbon atoms per molecule, average molecular formula $C_{24}H_{29}Cl_{21}$. CP-40 is a viscous liquid having an average combined chlorine content of 42½ weight per cent, and containing from 40 to 45 weight per cent combined chlorine and containing molecules having at least 20 but no more than 28 carbon atoms per molecule, average molecular formula $C_{26}H_{46.5}Cl_{7.5}$. These chlorinated paraffin hydrocarbons contain less than 0.1 weight per cent free chlorine and are easily handled on a mill or in a Banbury mixer and, as they are non-hydroscopic, toxicity problems are minimized. Such a paraffin chloride also has the further effect of improving both flex-life and heat build-up with only a slight sacrifice in abrasion resistance. In practicing my invention, the paraffin chloride can be added either on a mill or in a Banbury mixer or it may be mixed with the carbon black before the black is added in the first stage of mixing. The paraffin chloride can be incorporated in the rubber mix before, during or after the other ingredients are added. The paraffin chlorides of my invention are useful and will retard too rapid vulcanization caused by a high pH carbon black in rubber mixes containing natural, synthetic or reclaimed rubber, or various mixtures of the above-mentioned types of rubber. The paraffin chlorides used in the practice of my invention are particularly adaptable to the problems of tire tread manufacture in which the rubber mix from which the tread is formed contains from 40 to 65 parts of carbon black per 100 parts of rubber, usually natural rubber or the new synthetic copolymers of butadiene-styrene produced at low temperatures, such as GR-S rubber and recently developed "low-temperature" variants thereof. The chlorinated paraffins of my invention will effectively retard vulcanization of rubber mixes where the vulcanization has been accelerated due to the high pH of the carbon black. Most rubber mixes contain from 10 to 65 parts of carbon black per 100 parts of rubber. The problem of too rapid vulcanization becomes greater as the amount of high pH carbon black is increased; therefore, it is necessary that a greater amount of the chlorinated paraffin be added as the amount of carbon black is increased in order to retard the vulcanization. In practicing my invention, one skilled in the art will have no trouble in determining the amount of chlorinated paraffin necessary to effectively retard vulcanization for any particular recipe or rubber mix. The Mooney scorch time for any particular rubber mix may be determined, and the addition of chlorinated paraffin will increase this Mooney scorch time so that there will be no problem of premature vulcanization during processing. Usually a Mooney scorch time of 18 minutes at 250° F. will be sufficient so that the rubber mix can be processed without the mix scorching.

My invention is applicable to rubber mixes containing organic accelerators of vulcanization. The ultra accelerators and semi-ultra accelerators of vulcanization tend to cause scorching when used with high pH carbon blacks. The chlorinated paraffins used in my invention will retard acceleration of vulcanization caused by high pH carbon black so as to prevent scorching. My invention is particularly adaptable to retarding vulcanization in rubber mixes containing benzothiazyl disulfide or its derivatives such as zinc benzothiazyl sulfide and acyl benzothiazyl disulfide. My invention is also particularly adaptable to those rubber mixes containing mercaptobenzothiazole or its derivatives, such as the dinitro phenyl ester of mercaptobenzothiazole. Other widely used accelerators of vulcanization such as thiuram monosulfide or its derivatives also give too rapid vulcanization when used with high pH carbon blacks and the chlorinated paraffins will effectively retard vulcanization when these accelerators are used along with high pH carbon blacks. Sometimes the rubber compounder will use more than one accelerator in a given rubber mix. The chlorinated paraffins will effectively retard vulcanization when a mixture of organic accelerators is used in conjunction with a high pH carbon black. For instance, rubber mixes in which benzothiazyl disulfide is the accelerator usually contain from 0.6 to 2.5 parts of the benzothiazyl disulfide per 100 parts of rubber and 2 to 3 parts of sulfur per 100 parts of rubber. CP-70 chlorinated paraffins in the range of 0.7 to 1.5 parts per 100 parts of rubber will effectively retard vulcanization or increase the Mooney scorch time of such a rubber mix. 0.8 to 1 part of benzothiazyl disulfide per 100 parts of rubber with 2.00 to 2.75 parts of sulfur per 100 parts of rubber will cover the most commonly practiced range. I have found that .7 to 1.3 parts of CP-70 per 100 parts of rubber will effectively retard vulcanization or increase the Mooney scorch time of such a mixture. When CP-40 is used as the retarder more of the chlorinated paraffin is added. For instance, in a mix containing from 0.6 to 2.5 parts of benzothiazyl disulfide and 2 to 3 parts of sulfur it is necessary to add from 0.9 to 2.5 parts of CP-40, per 100 parts of rubber, to effectively retard vulcanization or to increase the Mooney scorch time. One skilled in the art will have no trouble determining the amount of either CP-40 or CP-70 necessary to effectively retard the vulcanization of any given rubber mix so that the problem of scorching during processing is overcome.

In the following example of my invention the amounts, particular ingredients and conditions are given as typical and are not to be construed so as to narrow the scope of my invention.

*Example*

The following master batch was made up and contained:

| | Parts by Weight |
|---|---|
| Smoked sheets | 100 |
| HAF carbon black (pH 9.0) | 50 |
| Zinc oxide | 5 |
| Antioxidant | 1 |
| Stearic acid | 3 |
| L. V. Asphaltum oil | 3 |
| Sulfur | 2.5 |
| Benzothiazyl disulfide | 0.6 |
| | 165.1 |

The antioxidant used in the master batch was Thermoflex A which is a mixture of 25 per cent di-p-methoxy-diphenylamine, 25 per cent diphenyl-p-phenylenediamine and 50 per cent phenyl-B-naphthylamine. This rubber mix gave a Mooney scorch time of 12½ minutes at 250° F.

Six-tenths of a part of CP-70 per 100 parts of the Smoked Sheets was added to the master batch and a Mooney scorch test was run on a sample. This sample gave a Mooney scorch time of 18 minutes at 250° F. This increase of 5½ minutes in the Mooney scorch time at 250° F. is a great enough increase to effectively overcome any problem of scorch during the processing of this typical tread stock.

As will be evident to those skilled in the art, various modifications of this invention can be made, or followed, in the light of the foregoing disclosure and discussion, without departing from the spirit or scope of the disclosure or from the scope of the claims.

I claim:

1. In the process of making rubber products wherein the rubber mix, containing an organic accelerator of vulcanization, sulfur and a furnace carbon black having a pH of from 8.6 to 10.5, is preformed and vulcanized, that improvement which comprises adding to said rubber mix from 0.7 to 2.5 parts per 100 parts of rubber of a mixture of chlorinated paraffin hydrocarbons containing from 40 to 72 weight per cent combined chlorine and having from 20 to 28 carbon atoms per molecule.

2. In the process of making rubber products wherein the rubber mix, containing from 0.6 to 2.5 parts of benzothiazyl disulfide per 100 parts of rubber, 2 to 3 parts of sulfur per 100 parts of rubber and from 10 to 65 parts of a carbon black having a pH of from 8.6 to 10.1 per 100 parts of rubber, is preformed and vulcanized, that improvement which comprises adding to said rubber mix from 0.9 to 2.5 parts per 100 parts of rubber of a mixture of chlorinated paraffin hydrocarbons containing from 40 to 45 weight per cent combined chlorine and containing molecules having at least 20 and no more than 28 carbon atoms per molecule.

3. In the process of making natural rubber products wherein the rubber mix, containing from 0.6 to 2.5 parts of benzothiazyl disulfide per 100 parts of natural rubber, 2 to 3 parts of sulfur per 100 parts of natural rubber and from 10 to 65 parts of a carbon black having a pH of from 8.6 to 10.1 per 100 parts of natural rubber, is preformed and vulcanized, that improvement which comprises adding to said natural rubber mix from 0.7 to 1.5 parts per 100 parts of natural rubber of a mixture of chlorinated paraffin hydrocarbons containing from 68 to 72 weight per cent combined chlorine and containing molecules having at least 20 and no more than 28 carbon atoms per molecule.

4. In the process of making natural rubber treads wherein the rubber mix, containing from 0.8 to 1 part of benzothiazyl disulfide per 100 parts of natural rubber, 2 to 2.75 parts of sulfur per 100 parts of natural rubber and from 40 to 65 parts of a high abrasion furnace carbon black having a pH of from 8.6 to 10.1 per 100 parts of natural rubber, is preformed and vulcanized, that improvement which comprises adding to said rubber mix from 0.7 to 1.3 parts per 100 parts of natural rubber of a mixture of chlorinated paraffin hydrocarbons containing from 68 to 72 weight per cent combined chlorine and containing molecules having at least 20 and no more than 28 carbon atoms per molecule.

5. In the process of making rubber products wherein the rubber mix, containing benzothiazyl disulfide, sulfur and a carbon black having a pH of from 8.6 to 10.5, is preformed and vulcanized, that improvement which comprises adding to said rubber mix from 0.9 to 2.5 parts per 100 parts of rubber of a mixture of chlorinated paraffin hydrocarbons containing from 40 to 45 weight per cent combined chlorine and containing molecules having at least 20 and no more than 28 carbon atoms per molecule.

6. In the process of making rubber products wherein the rubber mix, containing benzothiazyl disulfide, sulfur and a carbon black having a pH of from 8.6 to 10.5, is preformed and vulcanized, that improvement which comprises, adding to said rubber mix from 0.7 to 1.5 parts per 100 parts of rubber of a mixture of chlorinated paraffin hydrocarbons containing from 68 to 72 weight per cent combined chlorine and containing at least 20 but no more than 28 carbon atoms per molecule.

7. In the process of making rubber products wherein the rubber mix, containing a mercaptobenzothiazole, sulfur and a carbon black having a pH of from 8.6 to 10.5, is preformed and vulcanized, that improvement which comprises, adding to said rubber mix from 0.9 to 2.5 parts per 100 parts of rubber of a mixture of chlorinated paraffin hydrocarbons containing from 40 to 45 weight per cent combined chlorine and containing molecules having at least 20 and no more than 28 carbon atoms per molecule.

8. In the process of making rubber products wherein the rubber mix, containing a mercaptobenzothiazole, sulfur and a carbon black having a pH of from 8.6 to 10.5, is preformed and vulcanized, that improvement which comprises, adding to said nubber mix from 0.7 to 1.5 parts per 100 parts of rubber of a mixture of chlorinated paraffin hydrocarbons containing from 68 to 72 weight per cent combined chlorine and containing molecules having at least 20 and no more than 28 carbon atoms per molecule.

9. A method of increasing the Mooney scorch time of a natural rubber mix, containing from 0.6 to 2.5 parts of benzothiazyl disulfide per 100 parts of natural rubber, 2 to 3 parts of sulfur per 100 parts of natural rubber and from 10 to 65 parts of a high abrasion furnace carbon black having a pH of from 8.6 to 10.5 per 100 parts of natural rubber, which comprises, adding to said natural rubber mix from 0.7 to 1.5 parts per 100 parts of natural rubber of a mixture of chlorinated paraffin hydrocarbons containing from 68 to 72 weight per cent combined chlorine and containing at least 20 but no more than 28 carbon atoms per molecule.

10. A method of increasing the Mooney scorch time to at least 18 minutes at 250° F., of a natural rubber tread mix, containing from 0.8 to 1 part of benzothiazyl disulfide per 100 parts of natural rubber, 2 to 2.75 parts of sulfur per 100 parts of natural rubber and from 40 to 65 parts of a high abrasion furnace carbon black having a pH of from 8.6 to 10.1 per 100 parts of natural rubber, which comprises, adding to said mix from 0.7 to 1.3 parts per 100 parts of natural rubber of a mixture of chlorinated paraffin hydrocarbons containing from 68 to 72 weight per cent combined chlorine and containing at least 20 but no more than 28 carbon atoms per molecule.

11. A vulcanizable rubber mix comprising, rubber, carbon black having a pH of from 8.6 to 10.5, sulfur, an organic accelerator of vulcanization and from 0.7 to 2.5 parts per 100 parts of said rubber of a mixture of chlorinated paraffin hydrocarbons containing from 40 to 72 weight per cent combined chlorine and having from 20 to 28 carbon atoms per molecule.

12. A vulcanizable rubber mix comprising, rubber, furnace carbon black having a pH of 8.6 to 10.1, sulfur, an organic accelerator of vulcanization and from 0.9 to 2.5 parts per 100 parts of said rubber of a mixture of chlorinated paraffin hydrocarbons containing from 40 to 45 weight per cent combined chlorine and containing molecules having at least 20 and no more than 28 carbon atoms per molecule.

13. The composition of matter of claim 12 wherein said organic accelerator of vulcanization is benzothiazyl disulfide.

14. The composition of matter of claim 13 wherein said benzothiazyl disulfide is present in an amount of from 0.6 to 2.5 parts, said carbon black is present in an amount of from 10 to 65 parts and said sulfur is present in an amount of from 2 to 3 parts, all parts per 100 parts of said rubber.

15. A vulcanizable rubber mix comprising, rubber, furnace carbon black having a pH of 8.6 to 10.1, sulfur, an organic accelerator of vulcanization and from 0.7 to 1.5 parts per 100 parts of said rubber of a mixture of chlorinated paraffin hydrocarbons containing from 68 to 72 weight per cent combined chlorine and containing molecules having at least 20 and no more than 28 carbon atoms per molecule.

16. The composition of matter of claim 15 wherein said organic accelerator of vulcanization is benzothiazyl disulfide.

17. The composition of matter of claim 16 wherein said benzothiazyl disulfide is present in an amount of from 0.6 to 2.5 parts, said carbon black is present in an amount of from 10 to 65 parts and said sulfur is present in an amount of from 2 to 3 parts, all parts per 100 parts of said rubber.

LYNN HARBISON.

REFERENCES CITED

The following references are of record in the file of this patent:

UNITED STATES PATENTS

| Number | Name | Date |
|---|---|---|
| 1,794,558 | Spear et al. | Mar. 3, 1931 |
| 1,871,037 | Cadwell | Aug. 9, 1932 |
| 2,090,629 | Hiers et al. | Aug. 24, 1937 |
| 2,171,901 | Wilson | Sept. 5, 1939 |
| 2,278,539 | Elliott | Apr. 7, 1942 |

OTHER REFERENCES

"Rubber Age" (New York)—vol. 50 of 1941—pgs. 21–27.

"Rubber World"—vol. 119 of Oct. 1948—pgs. 57–62.